Dec. 30, 1924.

C. C. LAURITSEN 1,520,874

RECORDING AND INDICATING MECHANISM

Filed Jan. 6, 1921  3 Sheets-Sheet 1

Dec. 30, 1924.

C. C. LAURITSEN 1,520,874

RECORDING AND INDICATING MECHANISM

Filed Jan. 6, 1921  3 Sheets-Sheet 2

Inventor
Charles C. Lauritsen
By Hull, Smith, Brocks & West
Attys.

Dec. 30, 1924.
C. C. LAURITSEN
1,520,874
RECORDING AND INDICATING MECHANISM
Filed Jan. 6, 1921   3 Sheets-Sheet 3
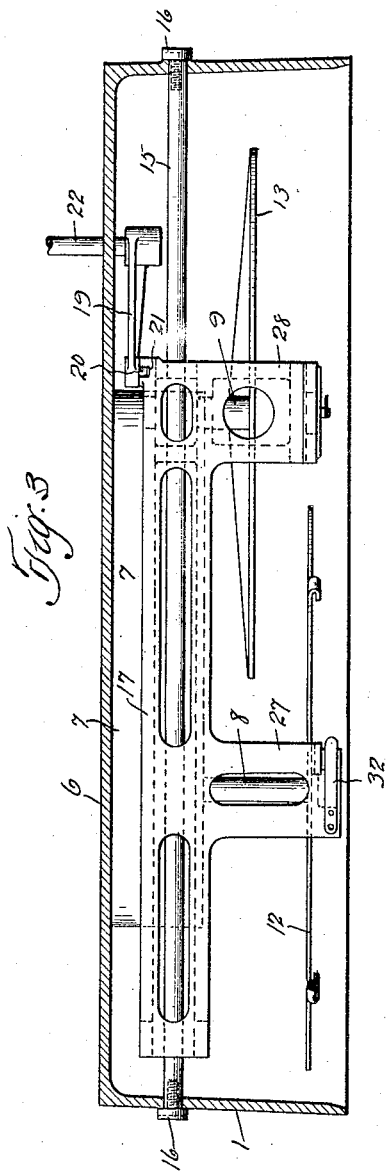
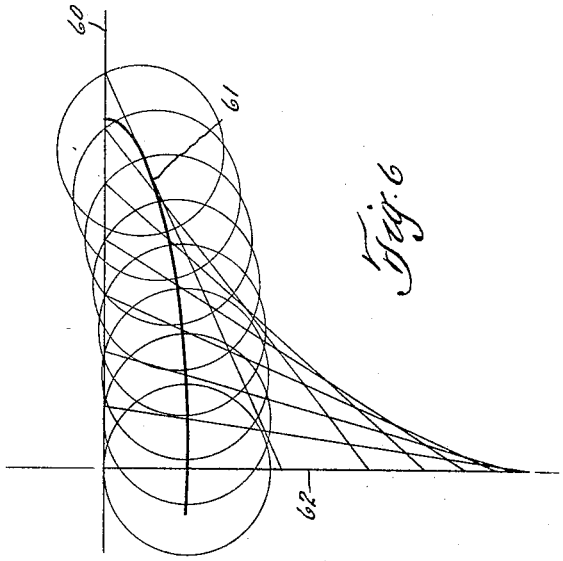
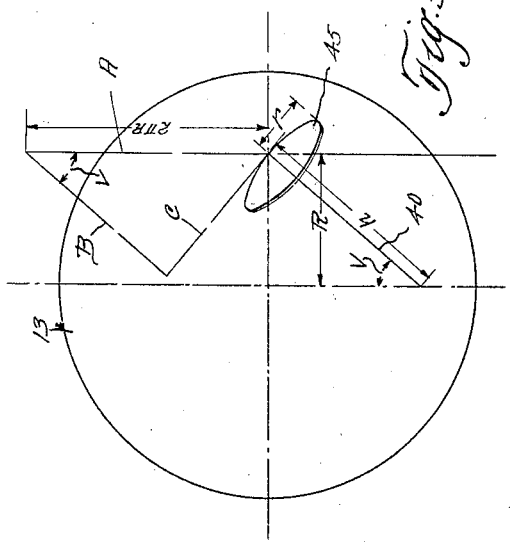
Inventor
Charles C. Lauritsen
By Hull, Smith, Brock & West
Attys.

Patented Dec. 30, 1924.

1,520,874

UNITED STATES PATENT OFFICE.

CHARLES C. LAURITSEN, OF CLEVELAND, OHIO, ASSIGNOR, BY MESNE ASSIGNMENTS, TO THE SWARTWOUT COMPANY, OF CLEVELAND, OHIO, A CORPORATION OF OHIO.

RECORDING AND INDICATING MECHANISM.

Application filed January 6, 1921. Serial No. 435,314.

*To all whom it may concern:*

Be it known that I, CHARLES C. LAURITSEN, a subject of the King of Denmark, residing at Cleveland, in the county of Cuyahoga and State of Ohio, have invented a certain new and useful Improvement in Recording and Indicating Mechanism, of which the following is a full, clear, and exact description, reference being had to the accompanying drawings.

This invention relates to a recording and indicating apparatus and is directed more particularly to an apparatus of the aforesaid character which shall be capable of recording a variable quantity both by graphic representation and by numerical indication.

Some of the objects of the present invention are to provide a recording and indicating apparatus which shall be capable of recording and indicating a variable quantity which varies as the square of a variable; to provide a recording and indicating apparatus which shall record the aforesaid measurement continuously and which shall indicate the total value instantly for any previous time as well as record the various rates of change of value which establish said total; to provide an apparatus of the aforesaid character which shall be simple in construction, inexpensive of manufacture, and accurate in operation, while further objects and advantages will appear as the description proceeds.

While my apparatus is capable of use for measuring any quantity which varies as the square of a variable, it has particular use for measuring the quantity of liquid flowing through a parabolic weir such as described in my copending application Serial No. 359,933, filed February 19, 1920, wherein it was fully demonstrated that the quantity of liquid flowing through such a weir varies directly as the square of the height of liquid flowing therethrough.

Figure 1:
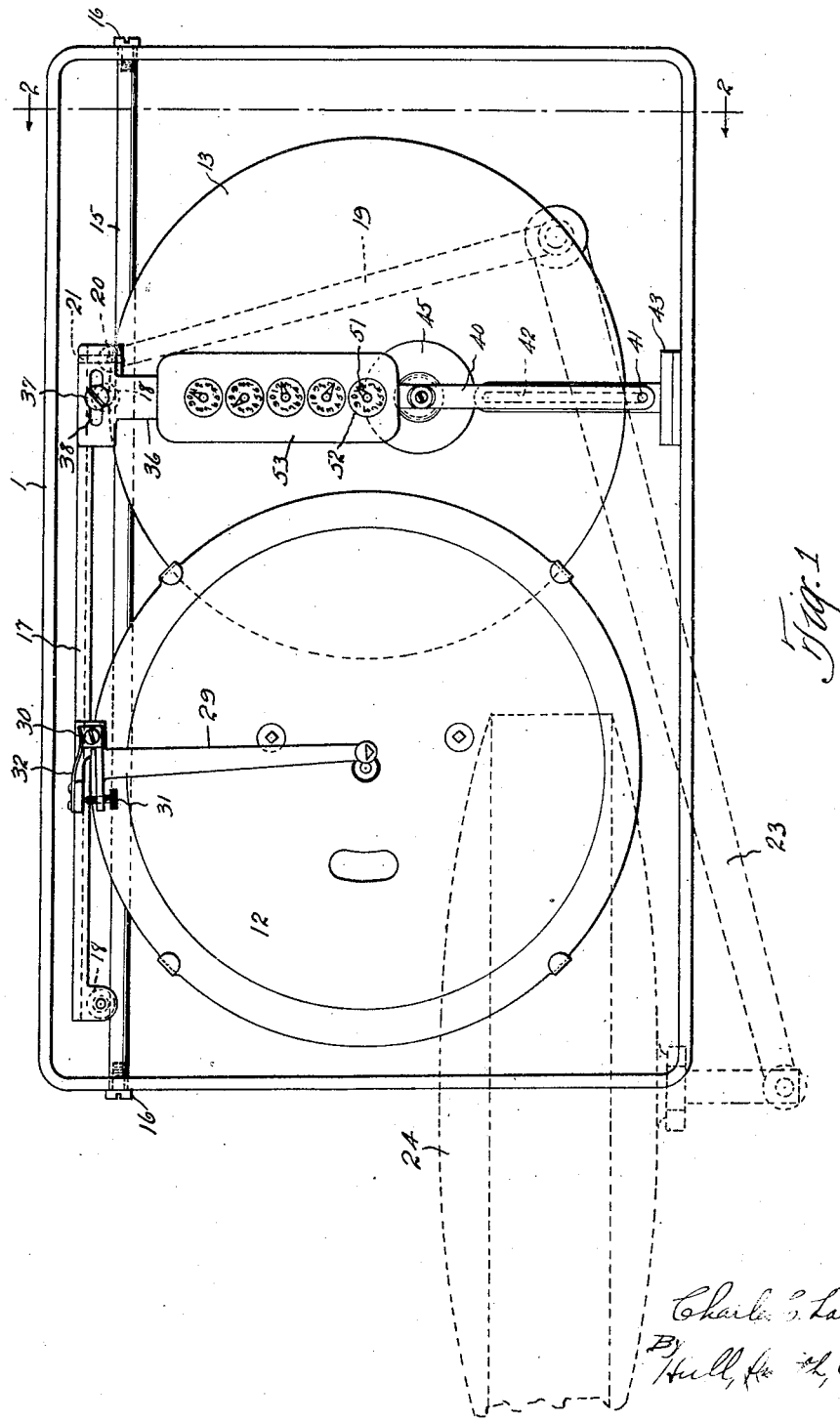
Figure 2:
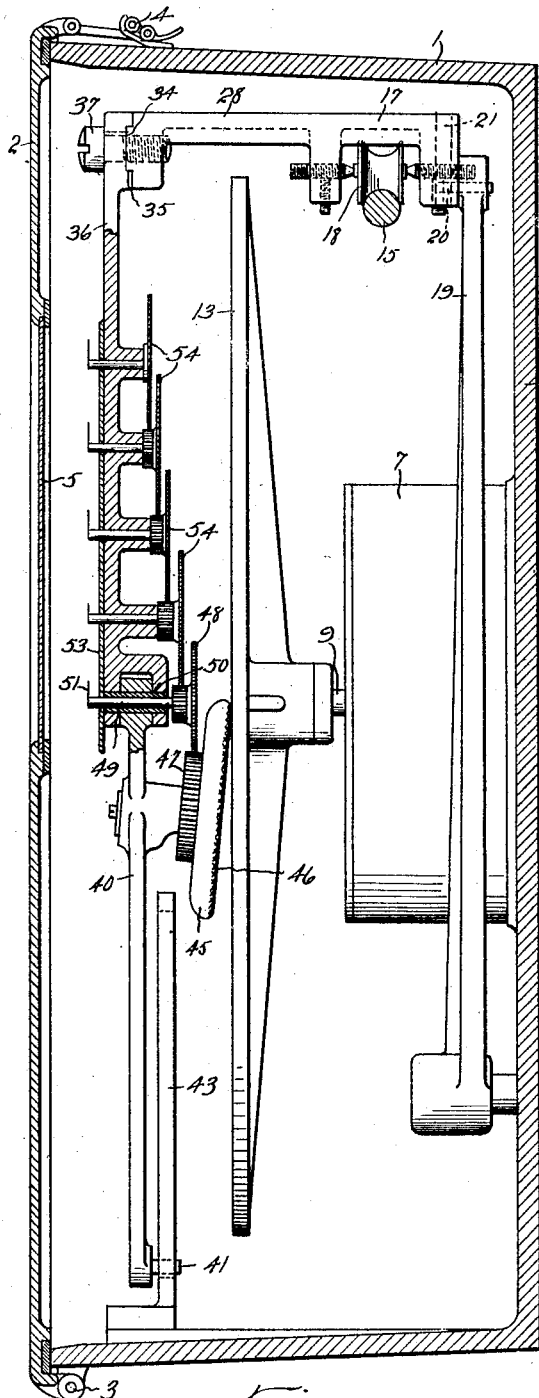
Figure 4:
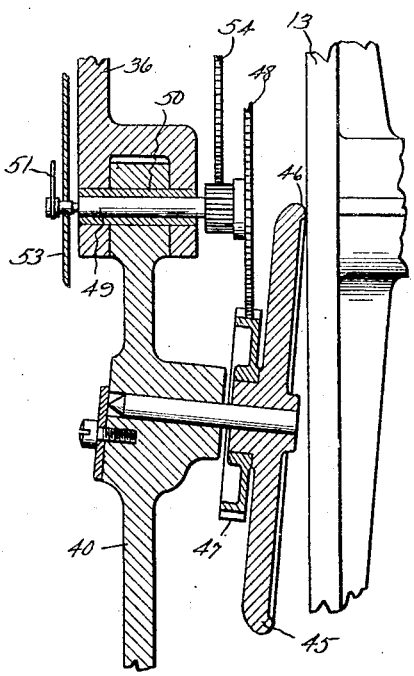

In the accompanying drawings, wherein I have shown an illustrative embodiment of my invention constructed to measure the liquid flowing through a weir having the properties above referred to, but without intent to limit myself thereto, Fig. 1 is a front elevation of my apparatus with the cover plate removed to show the interior mechanism; Fig. 2 is a sectional view taken on the line 2—2 of Fig. 1 and also showing the cover plate in position; Fig. 3 is a top plan view of my apparatus with the casing broken away to more clearly show the interior mechanism; Fig. 4 is a detail sectional view of the driven wheel and associated parts and Figs. 5 and 6 are diagrammatic views illustrating the mathematical principle underlying my invention.

Describing by reference characters the various parts illustrated, 1 indicates a suitable housing which may be closed on the front side by a door 2 (Fig. 2) hinged at its lower end as indicated at 3 and fastened at the top thereof by a suitable catch shown at 4. The indicating dials and chart may be viewed through suitable windows formed in the door 2, one of which is shown at 5. The rear wall 6 of the casing has fastened thereto on the interior side, a clockwork indicated generally at 7 (Figs. 2 and 3) which has two drive shafts 8 and 9 projecting therefrom, the shaft 8 being geared in such manner as to complete one revolution every twenty-four hours, while the shaft 9 is geared to complete one revolution every thirty minutes. As shown in Fig. 3 the shaft 8 projects forwardly beyond the shaft 9 and has fastened thereto a chart supporting disk 12. A driving disk 13 is fastened to shaft 9 for a purpose to be described hereinafter.

Adjacent the top of the housing 1, a longitudinal guide rod 15 is fastened in any suitable manner as by means of the machine bolts 16 threaded in the ends thereof from the exterior of the casing. A carriage 17, supported on rollers 18 is slidable longitudinally of said rod by means of a pivoted arm 19 having a pin 20 at the upper end thereof engaged in a vertical slot 21 formed in the rear side of the carriage. The lower end of the arm 19 is fastened to a shaft 22 projecting through the rear of the casing and into a suitable chamber (not shown). An arm 23 (Fig. 1) is adjustably fastened to the inner end of said shaft and a float 24 is swiveled to the free end of said arm. It is thus apparent that the rise and fall of liquid in the weir chamber will cause a corresponding rise and fall of the float 24 which in turn moves the carriage 17 a proportionate distance to the right or left along the guide rod 15.

The carriage 17 as shown in Figs. 1 and 2 is formed with two forward projections 27 and 28, projection 27 being provided at the forward end thereof with a stylus arm 29, pivoted as indicated at 30 and adjustable about said pivot point by means of an adjusting screw 31. The stylus arm is held in adjusted position by a spring 32 fastened to the projection 27 and engaged with said stylus arm in such manner as to tend to force the adjusting screw 31 into contact with the projection 27. I am thus enabled to adjust the stylus arm to a zero portion of the chart fastened to the disk 12. The forward end of projection 28 is provided with a tongue 34 (Fig. 2) which fits into a groove 35 formed in the upper end of a dial supporting member 36. The member 36 is adjustable longitudinally of the projection 28 to bring it and the associated parts to zero position as will be more fully understood as the description proceeds. A screw 37 engaged in a slot 38 in the member 36 and threaded with the projection 28 holds said member in adjusted position. An arm 40 is pivoted at its upper end in the bifurcated lower end of member 36, and at its lower end, the arm 40 is provided with a pin 41 which is engaged in a slot 42 formed in a standard 43 rising from the lower wall of the housing 1. Journaled in the upper portion of arm 40 is an angularly disposed driven wheel 45 having a knurled peripheral surface 46 which contacts with the driving disk 13 along a horizontal diameter thereof. As shown in Figs. 2 and 4, a drive pinion 47 is fastened to the hub of the wheel 45 and meshes with a gear 48 fastened to a counter shaft 49 which is journaled in a bushing 50, said bushing serving also as a pivotal connection between the member 36 and arm 40. A pointer 51 fastened to the forward end of the shaft 49 is rotatable therewith and cooperates with a suitable dial 52 (Fig. 1) marked on a plate 53 to indicate the units. A suitable number of similar pointers and dials are mounted, one above the other, and connected by a train of gearing 54 in such manner as to bear a suitable relationship to each other, as for example, units, tens, hundreds, thousands, and ten thousands.

With the parts arranged and constructed as described thus far the operation of the device will be as follows: The clockwork 7 is started which causes the disk 12 to rotate at the rate of one revolution every twenty-four hours and the disk 13 at the rate of one revolution every thirty minutes. The stylus arm 29 having been previously adjusted to zero when the float 24 was at zero level with the weir notch, and the member 36 adjusted to position the contacting portion of the driven wheel 45 at the center of the driving disk 13, then as the carriage is moved to the right a distance proportionate to the rise of the float 24 in the weir chamber, it will be evident that the stylus will be moved outward along a horizontal radius on the chart and will enclose a 360° area of the chart in any unit of time, or in the present instance every 24 hours, and each change of position of float 24 and carriage 17 will cause a similar change of position of the stylus on the chart. Since the area of a circle is equal to a constant times the square of the radius then it is evident that the enclosed area on the chart is directly proportional to the square of a variable. In my copending application above referred to I have shown that the quantity of liquid passing through a parabolic weir is directly proportional to the square of the height of the liquid passing therethrough. Hence the enclosed area on the chart is directly proportional to the quantity of liquid passing through the weir notch. Suitable ratios between the lengths of the various lever arms connecting the float and carriage may be selected so that the area enclosed may be equal to the quantity of liquid which has passed through the weir notch in a given time; or such ratios may be chosen that the quantity may be equal to some constant times the area.

The operation of the indicating dials is as follows: As the carriage moves from zero position to the right, the rigid vertical member 36 will carry the pivoted upper end of the arm 40 therewith and the lower end of said arm will be guided vertically by the pin and slot connection. Hence, by referring to the diagrammatic representation in Fig. 6, it will be seen that the contact point of the wheel 45 will move along a horizontal radius indicated by the line 60 and the axis of said wheel will describe a parabola indicated by the heavy line 61. The straight lines connecting the horizontal radius with the vertical line 62 represent the fixed length of the arm 40. The vertical line 62 corresponds with the slotted standard 43. It is thus apparent that as the carriage 17 moves to the right it will carry the wheel 45 outwardly along a horizontal radius of the driving disk 13 and that the speed of said wheel will be greater as it progresses outwardly along said radius. By referring to Fig. 5 it will be shown that the speed or number of revolutions per unit of time of the wheel 45 varies directly as the square of a variable. In this diagrammatic representation, we will assume that the wheel 45 has a radius of $r$, and that it is moved out a distance R on the driving disk 13, and that the arm 40 has a length $h$ and forms an angle $v$ with the vertical axis of the disk 13. Then for every revolution of the disk 13, the wheel 45 will theoretically travel a distance equal to that circumference passing through the point of contact, which in the present instance will be measured by the expression $2\pi R$. However a portion of the distance $2\pi R$ is lost due to end thrust on the wheel because of the angular disposition of the wheel to the disk. If we lay off a line A parallel to the vertical axis of the disk 13 and which passes through the contact point, and measure along said line from contact upward a distance equal to $2\pi R$ then we will have the distance the wheel should travel over in one revolution of disk 13. However, since a portion of this distance is lost in end thrust, then to find the actual distance traveled it will be necessary to resolve the distance $2\pi R$ into vectors representing end thrust and actual distance traveled. These vectors are indicated by the lines B and C. Vector B is parallel to the arm 40 hence its driving effect is equal to zero since it is consumed in end thrust on the wheel. Vector C is the actual distance traveled by the wheel and such distance may be represented by the equation:

(1) $\quad C = 2\pi R \sin V$

The angle between lines A and B is equal to angle $v$ since it is the opposite angle of a parallelogram.

The number of revolutions wheel 45 will make for one complete revolution of disk 13 will be equal to the actual line of travel divided by the circumference of said wheel which may be represented by the equation:

(2) $\quad N = \dfrac{2\pi R \sin v}{2\pi r} = \sin v \dfrac{R}{r}$

But the sin of angle $v$ is equal $\dfrac{R}{h}$ and substituting in equation (2) we get $$N = \dfrac{R^2}{hr}$$

However $h$ and $r$ are both constants and $R^2$ a variable, hence the number of revolutions per unit of time or the speed of the wheel 45 varies directly as the square of a variable.

By choosing suitable gears between the wheel 45 and the indicating dials, I am enabled to record directly the quantity of liquid flowing through a weir which varies directly as the square of the height of such liquid.

While I have shown and described my apparatus as applied to the measurement of a liquid flowing through a weir having the aforesaid properties, it will be understood that with suitable modifications of the carriage actuating mechanism and other elements it could be used for measuring any quantity which varies as the square of a variable.

Having thus described my invention what I claim is:

1. A mechanism of the character described comprising two disks, means for rotating each of said disks at constant speeds, a stylus adapted to engage a sheet attached to one of said disks, a wheel engaged with the surface of the other of said disks, numerical indicating means connected with said wheel, interconnecting means between said stylus and said wheel for moving them in unison, and means for moving said interconnecting means to cause said stylus and said indicating means to measure a quantity which varies as the square of a variable.

2. A mechanism of the character described comprising two disks, means for rotating each of said disks at constant speeds, a stylus adapted to engage a sheet attached to one of said disks, an angularly disposed wheel having a peripheral portion in contact with the surface of the other of said disks, numerical indicating means connected with said wheel, interconnecting means between said stylus and said wheel for moving them in unison along a radius of each disk and means for moving said interconnecting means to cause said stylus and said indicating means to measure a quantity which varies as the square of a variable.

3. A mechanism of the character described comprising two disks, means for rotating each of said disks at a constant speed, one of said disks being adapted to receive a chart, means for marking on said chart, a wheel operatively engaged with the other of said disks, numerical indicating means operatively connected with said wheel, and means for moving said marking means and said wheel along radii on said disks to respectively record and indicate a quantity which varies as the whole power of a variable.

4. A mechanism of the character described comprising two disks, means for rotating each of said disks at a constant speed and one at a slower rate than the other, the slower moving disk being adapted to receive a chart, a carriage, a stylus connected to said carriage and adapted to engage said chart, numerical indicating mechanism connected to said carriage, means connecting said mechanism with the other of said disks, and means for moving said carriage to cause said stylus and indicating mechanism to measure a variable quantity.

5. A mechanism of the character described comprising a disk, means for rotating said disk at a constant speed, a numerical indicating mechanism having a wheel operatively engaged with said disk, and means for moving said wheel along a radius of said disk thereby to cause said indicating mechanism to measure a quantity which varies as the square of a variable.

6. A mechanism of the character described comprising a disk, means for rotating said disk at a constant speed, a carriage, a numerical indicating mechanism connected to said carriage and having a wheel operatively engaged with said disk, an arm pivotally connected to said indicating mechanism, means for guiding a portion of said arm along a predetermined line, and means for moving said carriage and indicating mechanism thereby to move said wheel along a radius on said disk.

7. A mechanism of the character described comprising a disk, means for rotating said disk at a constant speed, a carriage, a numerical indicating mechanism connected to said carriage, an arm pivotally connected to said indicating mechanism, a wheel journaled on said arm, said wheel being operatively connected to said indicating mechanism and said disk, means for guiding a portion of said arm along a straight line, and means for moving said carriage thereby to move said wheel along a radius on said disk and cause said indicating mechanism to measure a quantity which varies as the square of a variable.

8. A mechanism of the character described comprising a disk, means for rotating said disk at a constant speed, a carriage, a numerical indicating mechanism rigidly connected to said carriage, an arm pivotally connected at one end to said indicating mechanism, the other end of said arm having a pin engaged in a straight line slot, a wheel journaled on said arm, said wheel being operatively connected with said indicating mechanism and with said disk, and means for moving said carriage thereby to move said wheel along a radius on said disk and cause said indicating mechanism to measure a quantity which varies as the square of a variable.

9. A mechanism of the character described comprising a disk adapted to receive a chart, means for rotating said disk at a constant speed, a carriage, a stylus arm connected to said carriage and adapted to contact with said chart along a radius, and means for moving said carriage thereby to cause said stylus to enclose an area on said chart and indicate graphically a quantity which varies as the square of a variable.

10. A mechanism of the character described comprising a disk adapted to receive a chart, means for rotating said disk at a constant speed, a carriage, a stylus arm connected to said carriage and adapted to contact with said chart along a radius, and a float mechanism connected with said carriage and adapted to move said carriage and stylus in accordance with the movement of said float, said stylus being adapted to enclose an area on said chart and thereby indicate graphically a quantity which varies as the square of a variable.

11. A mechanism of the character set forth comprising two disks, means for rotating said disks at a constant speed, a carriage movable with respect to said disks, a stylus arm connected to said carriage and adapted to engage a chart fastened to one of said disks, a numerical indicating mechanism connected to said carriage, an arm pivotally connected to said indicating mechanism, a wheel journaled on said arm, said wheel being operatively connected to said indicating mechanism and to the other of said disks, means for moving said carriage, and means for causing said wheel to move along a radius of said disk in accordance with the movement of said carriage.

12. A mechanism of the character set forth comprising two disks, means for rotating said disks at a constant speed and one at a greater speed than the other, a carriage movable with respect to said disks, a stylus arm connected to said carriage and adapted to engage a chart fastened to the slower moving disk, said stylus being adapted to engage said chart along a radius, a numerical indicating mechanism connected to said carriage, an arm pivotally connected to said indicating mechanism, a wheel journaled on said arm and operatively connecting the other of said disks with said indicating mechanism, means for moving said carriage, and means for guiding a portion of said arm along a straight line thereby to move said wheel along a radius on said disk.

In testimony whereof, I hereunto affix my signature.

CHARLES C. LAURITSEN.